(12) United States Patent
Sivasubramanian et al.

(10) Patent No.: US 9,135,283 B2
(45) Date of Patent: *Sep. 15, 2015

(54) SELF-SERVICE CONFIGURATION FOR DATA ENVIRONMENT

(75) Inventors: Swaminathan Sivasubramanian, Seattle, WA (US); Grant Alexander MacDonald McAlister, Seattle, WA (US); Rajesh Sudhakar Sheth, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 513 days.

This patent is subject to a terminal disclaimer.

(21) Appl. No.: 12/575,381

(22) Filed: Oct. 7, 2009

(65) Prior Publication Data

US 2011/0083138 A1 Apr. 7, 2011

(51) Int. Cl.
*G06F 17/30* (2006.01)

(52) U.S. Cl.
CPC .............................. *G06F 17/30306* (2013.01)

(58) Field of Classification Search
CPC ................................................. G06F 17/30306
USPC ......................................................... 707/609
See application file for complete search history.

(56) References Cited

U.S. PATENT DOCUMENTS

| | | | |
|---|---|---|---|
| 5,263,165 A | 11/1993 | Janis | |
| 5,555,404 A | 9/1996 | Torbjornsen et al. | |
| 6,018,746 A | 1/2000 | Hill et al. | |
| 6,205,465 B1 | 3/2001 | Schoening et al. | |
| 6,442,707 B1 | 8/2002 | McGrath et al. | |
| 6,542,907 B1 | 4/2003 | Cohen | |
| 6,560,639 B1 | 5/2003 | Dan et al. | |
| 6,611,867 B1 | 8/2003 | Bowman-Amuah et al. | |
| 6,671,821 B1 | 12/2003 | Castro et al. | |

(Continued)

FOREIGN PATENT DOCUMENTS

| | | |
|---|---|---|
| CN | 1573753 | 2/2005 |
| CN | 101501668 A | 8/2009 |

(Continued)

OTHER PUBLICATIONS

U.S. Appl. No. 12/418,475, filed Apr. 3, 2009, Sheth.

(Continued)

*Primary Examiner* — Tarek Chbouki
*Assistant Examiner* — Matthew Ellis
(74) *Attorney, Agent, or Firm* — Robert C. Kowert; Meyertons, Hood, Kivlin, Kowert & Goetzel, P.C.

(57) ABSTRACT

The values of various operating and/or configuration parameters of a data environment are managed using a set of self-service Web services and interfaces of a separate control environment. A customer can submit a Web services call into an externally-facing application programming interface (API) or other such externally-facing interface of the control environment. The API receiving the call, as well as information extracted from the call, can be used to determine appropriate adjustments to be performed in the data environment. A workflow can be instantiated that includes tasks used to validate and/or apply the adjustments to the target resources, such as databases, data instances, data stores, instance classes, etc. Various real-time functions such as monitoring and auto-scaling also can be performed via the control plane.

25 Claims, 6 Drawing Sheets

(56) References Cited

U.S. PATENT DOCUMENTS

| | | | |
|---|---|---|---|
| 6,675,299 B2 | 1/2004 | Porter et al. | |
| 6,961,768 B2 | 11/2005 | Davis et al. | |
| 6,981,135 B1* | 12/2005 | Trask | 713/1 |
| 6,985,955 B2 | 1/2006 | Gullotta et al. | |
| 6,988,139 B1 | 1/2006 | Jervis et al. | |
| 7,062,559 B2 | 6/2006 | Yoshimura et al. | |
| 7,065,624 B1 | 6/2006 | Zahavi | |
| 7,124,289 B1 | 10/2006 | Suorsa | |
| 7,133,907 B2* | 11/2006 | Carlson et al. | 709/220 |
| 7,315,826 B1 | 1/2008 | Guheen et al. | |
| 7,415,484 B1 | 8/2008 | Tulkoff et al. | |
| 7,418,484 B2* | 8/2008 | Presley | 709/220 |
| 7,478,263 B1 | 1/2009 | Kownacki et al. | |
| 7,502,329 B2 | 3/2009 | Li et al. | |
| 7,506,021 B2 | 3/2009 | Polan et al. | |
| 7,536,686 B2* | 5/2009 | Tan et al. | 717/174 |
| 7,624,133 B1 | 11/2009 | Ojalvo | |
| 7,680,771 B2 | 3/2010 | Cialini et al. | |
| 7,769,721 B2 | 8/2010 | Ueoka et al. | |
| 7,801,932 B2 | 9/2010 | Krishnaswamy | |
| 7,827,547 B1 | 11/2010 | Sutherland et al. | |
| 7,966,528 B2 | 6/2011 | Troppmann et al. | |
| 7,991,749 B2 | 8/2011 | Nishikawa et al. | |
| 8,020,037 B1 | 9/2011 | Schwartz et al. | |
| 8,041,679 B1 | 10/2011 | Narayanan | |
| 8,078,587 B2 | 12/2011 | Wahlert et al. | |
| 8,121,981 B2 | 2/2012 | Simek et al. | |
| 8,150,808 B2* | 4/2012 | Zha et al. | 707/639 |
| 8,150,904 B2* | 4/2012 | Queck et al. | 709/201 |
| 8,156,082 B2 | 4/2012 | Srivastava et al. | |
| 8,307,003 B1 | 11/2012 | Gangadhar et al. | |
| 8,352,608 B1 | 1/2013 | Keagy et al. | |
| 8,364,460 B2 | 1/2013 | Ostermeyer et al. | |
| 8,392,915 B2 | 3/2013 | Friedman et al. | |
| 2001/0007133 A1 | 7/2001 | Moriconi et al. | |
| 2002/0001984 A1* | 1/2002 | Franzen et al. | 709/220 |
| 2002/0019844 A1 | 2/2002 | Kurowski et al. | |
| 2002/0032883 A1 | 3/2002 | Kampe et al. | |
| 2002/0147709 A1* | 10/2002 | Rajarajan et al. | 707/3 |
| 2003/0005091 A1 | 1/2003 | Ullmann et al. | |
| 2003/0212775 A1 | 11/2003 | Steele et al. | |
| 2003/0212898 A1 | 11/2003 | Steele et al. | |
| 2004/0073676 A1 | 4/2004 | Honma et al. | |
| 2004/0078637 A1 | 4/2004 | Fellin et al. | |
| 2004/0148443 A1 | 7/2004 | Achiwa | |
| 2004/0163008 A1 | 8/2004 | Kim | |
| 2004/0174823 A1 | 9/2004 | Steele et al. | |
| 2004/0225659 A1 | 11/2004 | O'Brien et al. | |
| 2005/0004999 A1* | 1/2005 | Moore et al. | 709/220 |
| 2005/0027845 A1 | 2/2005 | Secor et al. | |
| 2005/0038831 A1 | 2/2005 | Souder et al. | |
| 2005/0193245 A1 | 9/2005 | Hayden et al. | |
| 2005/0210128 A1 | 9/2005 | Cannon et al. | |
| 2005/0216788 A1 | 9/2005 | Mani-Meitav et al. | |
| 2005/0243611 A1 | 11/2005 | Lubbers et al. | |
| 2005/0262164 A1* | 11/2005 | Guiheneuf et al. | 707/203 |
| 2005/0283655 A1 | 12/2005 | Ashmore | |
| 2006/0036761 A1 | 2/2006 | Amra et al. | |
| 2006/0041641 A1 | 2/2006 | Breiter et al. | |
| 2006/0053251 A1 | 3/2006 | Nicholson et al. | |
| 2006/0104231 A1 | 5/2006 | Gidwani | |
| 2006/0106675 A1 | 5/2006 | Cohen et al. | |
| 2006/0106774 A1 | 5/2006 | Cohen et al. | |
| 2007/0022122 A1 | 1/2007 | Bahar et al. | |
| 2007/0061266 A1 | 3/2007 | Moore et al. | |
| 2007/0061487 A1 | 3/2007 | Moore et al. | |
| 2007/0078982 A1 | 4/2007 | Aidun et al. | |
| 2007/0083588 A1 | 4/2007 | Keller et al. | |
| 2007/0156842 A1 | 7/2007 | Vermeulen et al. | |
| 2007/0156872 A1 | 7/2007 | Stoyanova | |
| 2007/0162420 A1 | 7/2007 | Ou et al. | |
| 2007/0174691 A1 | 7/2007 | D'Souza et al. | |
| 2007/0192329 A1 | 8/2007 | Croft et al. | |
| 2007/0234028 A1 | 10/2007 | Rothman et al. | |
| 2007/0234115 A1 | 10/2007 | Saika | |
| 2007/0244996 A1 | 10/2007 | Ahmed et al. | |
| 2007/0260693 A1 | 11/2007 | Cardone et al. | |
| 2007/0260696 A1 | 11/2007 | Bohannon et al. | |
| 2007/0260912 A1 | 11/2007 | Hataski et al. | |
| 2007/0271275 A1 | 11/2007 | Fassette et al. | |
| 2007/0283443 A1 | 12/2007 | McPherson et al. | |
| 2007/0288526 A1 | 12/2007 | Mankad et al. | |
| 2007/0299828 A1 | 12/2007 | Lewis et al. | |
| 2008/0010513 A1 | 1/2008 | Devarakonda et al. | |
| 2008/0016293 A1 | 1/2008 | Saika | |
| 2008/0040509 A1 | 2/2008 | Werb et al. | |
| 2008/0052327 A1 | 2/2008 | Buah | |
| 2008/0065650 A1 | 3/2008 | Kim et al. | |
| 2008/0109448 A1 | 5/2008 | Aboel-Nil et al. | |
| 2008/0126734 A1 | 5/2008 | Murase | |
| 2008/0134176 A1 | 6/2008 | Fitzgerald et al. | |
| 2008/0134178 A1 | 6/2008 | Fitzgerald et al. | |
| 2008/0162590 A1 | 7/2008 | Kundu et al. | |
| 2008/0183991 A1 | 7/2008 | Cosmadopoulos et al. | |
| 2008/0189413 A1 | 8/2008 | Srivastava et al. | |
| 2008/0189769 A1 | 8/2008 | Casado et al. | |
| 2008/0195622 A1 | 8/2008 | Lelcuk et al. | |
| 2008/0244579 A1 | 10/2008 | Muller | |
| 2008/0256384 A1 | 10/2008 | Branson et al. | |
| 2008/0263388 A1 | 10/2008 | Allen et al. | |
| 2008/0301663 A1 | 12/2008 | Bahat | |
| 2009/0006888 A1 | 1/2009 | Bernhard et al. | |
| 2009/0019137 A1 | 1/2009 | Mishra et al. | |
| 2009/0019535 A1* | 1/2009 | Mishra et al. | 726/12 |
| 2009/0037425 A1* | 2/2009 | Erickson et al. | 707/10 |
| 2009/0063509 A1 | 3/2009 | Lockhart et al. | |
| 2009/0063563 A1 | 3/2009 | Khangaonkar et al. | 707/104.1 |
| 2009/0106411 A1 | 4/2009 | Lisiecki et al. | |
| 2009/0106441 A1 | 4/2009 | Zuckerman et al. | |
| 2009/0138577 A1 | 5/2009 | Casado et al. | |
| 2009/0164853 A1 | 6/2009 | Gokhale et al. | |
| 2009/0198940 A1 | 8/2009 | Ash et al. | |
| 2009/0216881 A1 | 8/2009 | Lovy et al. | |
| 2009/0271656 A1 | 10/2009 | Yokota et al. | |
| 2009/0328065 A1 | 12/2009 | Wookey | |
| 2010/0005531 A1 | 1/2010 | Largman | |
| 2010/0036851 A1 | 2/2010 | Paterson-Jones et al. | |
| 2010/0077160 A1 | 3/2010 | Liu et al. | |
| 2010/0125555 A1 | 5/2010 | Lau et al. | |
| 2010/0169707 A1 | 7/2010 | Mathew et al. | |
| 2010/0191713 A1 | 7/2010 | Lomet et al. | |
| 2010/0198972 A1 | 8/2010 | Umbehocker | |
| 2010/0211548 A1* | 8/2010 | Ott et al. | 707/655 |
| 2010/0250499 A1 | 9/2010 | McAlister et al. | |
| 2010/0250748 A1 | 9/2010 | Sivasubramanian et al. | |
| 2010/0251002 A1 | 9/2010 | Sivasubramanian et al. | |
| 2010/0251242 A1* | 9/2010 | Sivasubramanian et al. | 718/100 |
| 2010/0251339 A1* | 9/2010 | McAlister | 726/4 |
| 2010/0262650 A1 | 10/2010 | Chauhan et al. | |
| 2011/0004457 A1 | 1/2011 | Haviv et al. | |
| 2011/0004916 A1 | 1/2011 | Schiffman et al. | |
| 2011/0083138 A1* | 4/2011 | Sivasubramanian et al. | 719/328 |
| 2011/0099146 A1 | 4/2011 | McAlister et al. | |
| 2011/0099147 A1 | 4/2011 | McAlister et al. | |
| 2011/0099420 A1 | 4/2011 | McAlister et al. | |
| 2011/0178793 A1* | 7/2011 | Giffin et al. | 704/9 |
| 2011/0288847 A1* | 11/2011 | Narayanan et al. | 703/19 |

FOREIGN PATENT DOCUMENTS

| | | |
|---|---|---|
| CN | 101512507 | 8/2009 |
| JP | 10-312327 A | 11/1998 |
| JP | 2001518663 | 10/2001 |
| JP | 2003330781 | 11/2003 |
| JP | 2005-267056 A | 9/2005 |
| JP | 2006-011874 A | 1/2006 |
| JP | 2006048676 | 2/2006 |
| JP | 2009522659 | 6/2009 |
| JP | 2009522660 | 6/2009 |

(56) References Cited

FOREIGN PATENT DOCUMENTS

| | | |
|---|---|---|
| JP | 2009-230742 A | 10/2009 |
| JP | 2009230742 | 10/2009 |
| WO | 2008/058230 A | 5/2008 |

OTHER PUBLICATIONS

International Search Report mailed on May 25, 2010 for International Application No. PCT/US10/029476 filed on Mar. 31, 2010, 2 pages.
International Search Report mailed on Dec. 2, 2010 for International Application No. PCT/US10/051757 filed on Oct. 7, 2010, 2 pages.
International Search Report mailed on Dec. 21, 2010 for International Application No. PCT/US10/54133 filed on Oct. 26, 2010, 2 pages.
International Search Report mailed on Dec. 21, 2010 for International Application No. PCT/US10/54139 filed on Oct. 26, 2010, 2 pages.
International Search Report mailed on Dec. 21, 2010 for International Application No. PCT/US10/54141 filed on Oct. 26, 2010, 2 pages.
"Extended European Search Report dated Sep. 19, 2013", Europe Application 10827392.1, 6 pages.
"Final Office Action dated Dec. 19, 2011", U.S. Appl. No. 12/415,968.
"Final Office Action dated Feb. 22, 2013", U.S. Appl. No. 13/294,099.
"Final Office Action dated Mar. 22, 2011", U.S. Appl. No. 12/415,998.
"Final Office Action dated May 8, 2013", U.S. Appl. No. 12/416,017.
"Non Final Office Action dated Jan. 2, 2013", U.S. Appl. No. 13/620,962.
"Non Final Office Action dated Jan. 31, 2014", U.S. Appl. No. 12/415,998, 20 pages.
"Non Final Office Action dated Oct. 14, 2010", U.S. Appl. No. 12/415,998.
"Non Final Office Action dated Dec. 14, 2010", U.S. Appl. No. 12/415,987.
"Non Final Office Action dated Feb. 14, 2011", U.S. Appl. No. 12/606,097.
"Non Final Office Action dated Mar. 18, 2013", U.S. Appl. No. 13/299,601.
"Non Final Office Action dated Jun. 20, 2013", U.S. Appl. No. 13/620,999.
"Non Final Office Action dated Jun. 20, 2013", U.S. Appl. No. 13/621,073.
"Non Final Office Action dated Jul. 23, 2013", Japan Application 2012-536964.
"Non Final Office Action dated Jul. 23, 2013", Japan Application 2012-536966.
"Non Final Office Action dated Aug. 19, 2011", U.S. Appl. No. 12/416,017.
"Non Final Office Action dated Sep. 13, 2012", U.S. Appl. No. 13/294,099.
"Notice of Allowance dated Nov. 13, 2012", U.S. Appl. No. 12/415,968.
"Notice of Allowance dated Nov. 13, 2013", U.S. Appl. No. 12/606,106.
"Notice of Allowance dated Nov. 19, 2013", Japan Application 2012-536964.
"Notice of Allowance dated Nov. 19, 2013", Japan Application 2012-536966.
"Notice of Allowance dated Nov. 20, 2013", U.S. Appl. No. 12/606,106.
"Notice of Allowance dated Dec. 26, 2013", U.S. Appl. No. 12/415,958.
"Notice of Allowance dated Dec. 30, 2013", U.S. Appl. No. 13/620,999.
"Notice of Allowance dated Dec. 30, 2013", U.S. Appl. No. 13/621,073.
"Notice of Allowance dated Apr. 15, 2011", U.S. Appl. No. 12/415,987.
"Notice of Allowance dated Apr. 18, 2013", U.S. Appl. No. 13/620,962.
"Notice of Allowance dated Jun. 1, 2012", U.S. Appl. No. 12/415,968.
"Notice of Allowance dated Jul. 12, 2011", U.S. Appl. No. 12/606,097.
"Notice of Allowance dated Jul. 9, 2013", Japan Application 2012-533307.
"Notice of Allowance dated Aug. 12, 2013", U.S. Appl. No. 13/299,601.
"Notice of Allowance dated Aug. 26, 2013", U.S. Appl. No. 13/620,962.
"Notice of Allowance dated Aug. 8, 2011", U.S. Appl. No. 12/415,987.
"Supplemental Notice of Allowance dated Oct. 25, 2013", U.S. Appl. No. 13/294,099.
"Examination Report dated Oct. 31, 2012", Singaporean Application No. 201202502-9, Oct. 31, 2012, 8 pages.
"Examination Report dated Oct. 9, 2012", Singapore Application No. 201107040-6, Oct. 9, 2012, 5 pages.
"Examination Report dated May 17, 2013", Singaporean Application No. 201202967-4, May 17, 2013, 10 pages.
"Examination Report dated Sep. 13, 2013", Singaporean Application No. 201202868-4, Sep. 13, 2013, 5 pages.
"Examination Report dated Sep. 21, 2012", Singaporean Application No. 201202870-0, Sep. 21, 2012, 8 pages.
"Final Office Action dated Oct. 14, 2011", U.S. Appl. No. 12/415,958, Oct. 14, 2011, 34 pages.
"Final Office Action dated Oct. 19, 2011", U.S. Appl. 12/418,475, Oct. 19, 2011, 26 pages.
"Final Office Action dated Nov. 1, 2012", U.S. Appl. No. 12/606,106, Nov. 1, 2012, 29 pages.
"International Search Report dated Dec. 2, 2010", International Application No. PCT/US2010/051757, Dec. 2, 2010, 2 pages.
"Invitation to Respond to Written Opinion dated Sep. 14, 2012", Singaporean Application No. 201202967-4, Sep. 14, 2012, 14 pages.
"Non Final Office Action dated Mar. 14, 2012", U.S. Appl. No. 12/606,093, Mar. 14, 2012, 24 pages.
"Non Final Office Action dated Apr. 29, 2011", U.S. Appl. No. 12/415,968, Apr. 29, 2011, 30 pages.
"Non Final Office Action dated May 2, 2011", U.S. Appl. No. 12/418,475, May 2, 2011, 20 pages.
"Non Final Office Action dated May 31, 2012", U.S. Appl. No. 12/606,106, May 31, 2012, 29 pages.
"Non Final Office Action dated Sep. 14, 2012", U.S. Appl. No. 13/299,601, Sep. 14, 2012, 15 pages.
"Notice of Allowance dated Oct. 24, 2012", U.S. Appl. No. 12/606,093, Oct. 24, 2012, 13 pages.
"Notice of Allowance dated Mar. 16, 2012", U.S. Appl. No. 12/418,475, Mar. 16, 2012, 11 pages.
"Notice of Allowance dated Mar. 9, 2012", U.S. Appl. No. 12/415,958, Mar. 9, 2012, 29 pages.
"Notice of Allowance dated May 2, 2011", U.S. Appl. No. 12/415,958, May 2, 2011, 23 pages.
"Notice of Allowance dated Jun. 26, 2012", U.S. Appl. No. 12/606,093, Jun. 26, 2012, 8 pages.
"Notice of Allowance dated Jun. 28, 2012", U.S. Appl. No. 12/418,475, Jun. 28, 2012, 20 pages.
"Notice of Allowance dated Jul. 5, 2012", U.S. Appl. No. 12/415,958, Jul. 5, 2012, 14 pages.
"PCT Written Opinion dated Dec. 23, 2010", International Application No. PCT/US 10/54133, Dec. 23, 2010, 6 pages.
"Written Opinion dated Feb. 15, 2012", Singapore Application No. 201107040-6, Feb. 15, 2012, 6 pages.
Battles, Brett et al., "Reducing Data Center Power Consumption Through Efficient Storage", Google Scholar, <http://www.it-executive.nl/images/downloads/reducing-datacenter-power.pdf>, 2007, 9 pages.
Cordy, James R. , "Practical Language-Independent Detection of Near-Miss Clones", ACM, <http://delivery.acm.org/10.1145/1040000/1034915/p1-cordy.pdf>, 2001, 12 pages.

(56) References Cited

OTHER PUBLICATIONS

Ghemawat, Sanjay et al., "The Google File System", SOSP'03, Bolton Landing, New York., Oct. 19-22, 2003, 15 pages.
Lahiri, Tirthankar et al., "Cache Fusion: Extending Shared-Disk Clusters with Shared Caches", 27th VLDB Conference; Roma, Italy., 2001, 4 pages.
Lomet, David et al., "Recovery from "Bad" User Transactions", ACM, <http://delivery.acm.org/10.1145/1150000/1142512/p337-lomet.pdf>, 2006, 10 pages.
Lorentz, Diana et al., "Oracle 9i SQL Reference", Release 2 (9.2), Oracle Corporation., Oct. 2002, 1-1 to 1-3.
Mietzner, Ralph et al., "Towards Provisioning the Cloud: On the Usage of Multi-Granularity Flows and Services to Realize a Unified Provisioning Infrastructure for SaaS Applications", 2008 IEEE Congress on Services, Part 1, 2008, 3-10.
Wang, Yi et al., "Virtual Routers on the Move: Live Router Migration as a Network-Management Primitive", ACM, <http://delivery.acm.org/10.1145/1410000/1402985/p231-wang.pdf>, 2008, 12 pages.
U.S. Non-Final Office Action issued in U.S. Appl. No. 12/416,017 dated Apr. 9, 2014.
U.S. Non-Final Office Action issued in U.S. Appl. No. 13/621,044 dated May 7, 2014.
CA Office Action issued in Application Serial No. 2776384 dated Apr. 14, 2014.
CA Office Action issued in Application Serial No. 2778110 dated Apr. 3, 2014.
English translation of the First Office Action mailed Apr. 21, 2014; in corresponding Chinese patent application No. 201080056327.0.
First Office Action mailed Apr. 21, 2014; in corresponding Chinese patent application No. 201080056327.0.
English translation of the Notice of Allowance and fee(s) Due mailed Jul. 9, 2013; in corresponding Japanese patent application No. 2012533307.
Notice of Allowance and fee(s) Due mailed Jul. 9, 2013; in corresponding Japanese patent application No. 2012533307.
Suzuki, Masanori, Development of a Cooperative Server management Tool Using Logs History, Proceedings of the 71st (H21) Annual Convention of IPSL(3) Network Security, Information Processing Society of Japan, pp. 3-269-3-270, Mar. 10, 2009.
Examination Report mailed Oct. 29, 2012; in corresponding Singapore patent application No. 201202868-4.
Examination Report mailed Oct. 30, 2012; in corresponding Singaporean patent application No. 201107040-6.
Non-Final Office Action mailed May 28, 2013; in corresponding U.S. Appl. No. 12/606,106.
Final Office Action mailed Jul. 22, 2014; in corresponding U.S. Appl. No. 12/415,998.
Examination Report mailed Oct. 19, 2012; in corresponding Singapore patent application No. 201202870-8.
Examination Report mailed Dec. 11, 2012; in corresponding Singapore patent application No. 201202502-9.
Written Opinion mailed Oct. 2, 2012; in corresponding Singapore patent application No. 201202967-4.
Non-Final Office Action mailed Apr. 9, 2014; in corresponding U.S. Appl. No. 12/416,017.
Written Request for Examination mailed May 19, 2014; in corresponding Japanese patent application No. 2014085421.
English translation for Office Action mailed Jun. 12, 2014; in corresponding Chinese patent application No. 201080049395.4.
Office Action mailed Jun. 12, 2014; in corresponding Chinese patent application No. 201080049395.4.
Office Action mailed Jul. 25, 2014; in corresponding Canadian patent application No. 2,778,723.
English translation of the Office Action mailed Apr. 1, 2014; in corresponding Chinese patent application No. 201080053676.7.
Office Action mailed Apr. 1, 2014; in corresponding Chinese patent application No. 201080053676.7.
English translation of the Written Request for Examination mailed May 19, 2014; in corresponding Japanese patent application No. 2014085421.
English translation of the Notice of Allowance and Fee(s) Due mailed Mar. 18, 2014; in corresponding Japanese patent application No. 2012536965.
Notice of Allowance and Fee(s) Due mailed Mar. 18, 2014; in corresponding Japanese patent application No. 2012536965.
English translation of the Office Action mailed May 5, 2014; in corresponding Chinese patent application No. 201080056311.X.
Office Action mailed May 5. 2014; in corresponding Chinese patent application No. 201080056311.X.
Office Action mailed Sep. 16, 2014; in corresponding Japanese patent application No. 2013262835.
English language translation of the Office Action mailed Sep. 16, 2014; in corresponding Japanese patent application No. 2013262835.
English abstract for CN101512507; published on Aug. 19, 2009 and retrieved on Oct. 21, 2014.
English abstract for JP2009522660; published on Jun. 11, 2009 and retrieved on Oct. 21, 2014.
English abstract for JP2001518663; published on Oct. 16, 2001 and retrieved on Oct. 21, 2014.
English abstract for JP2009230742; published on Oct. 8, 2009 and retrieved on Oct. 21, 2014.
English abstract for CN1573753; published Feb. 2, 2005 and retrieved on Oct. 21, 2014.
English abstract for JP2009522659; published on Jun. 11, 2009 and retrieved on Oct. 21, 2014.
English abstract for JP2006048676; published on Feb. 16, 2006 and retrieved on Oct. 21, 2014.
English abstract for JP2003330781; published on Nov. 21, 2003 and retrieved on Oct. 21, 2014.
Final Office Action mailed Nov. 6, 2014; in U.S. Appl. No. 12/416,017.
The Second office Action mailed Oct. 29, 2014; in corresponding Chinese patent application No. 201080053676.7.
English translation of the The Second office Action mailed Oct. 29, 2014; in corresponding Chinese patent application No. 201080053676.7.
English translationThe Second office Action mailed Oct. 27, 2014; in corresponding Chinese patent application No. 201080056311.X.
The Second office Action mailed Oct. 27, 2014; in corresponding Chinese patent application No. 201080056311.X.
"IBM Redbook: SAN Volume Controller: Best Practices and Performance Guidelines (Draft), Tate et al. (Jul. 2007)".
"Unix/Linux Administration Logical Volume Management Guide (2005) To Pollock. ("Pollock")".
"z/VM and Linx on IBM System Z—The Virtualization Cookbook for Red Hat Enterprise Linux 5.2, MacIsaac et al. (Oct. 2008)".
Canadian Search Report in Application No. 2,776,384, Dated Apr. 27, 2015, pp. 1-4.

* cited by examiner

SELF-SERVICE CONFIGURATION FOR DATA ENVIRONMENT

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

While aspects of various applications and resources can be adjusted and managed in the cloud, the data repositories upon which these applications and resources rely are not similarly adjustable. Typically, performing tasks such as provisioning and scaling data storage are tedious manual procedures, in which a customer has to provide a database administrator (DBA) or similar expert user with configuration information and requirements, such that the DBA can determine whether the configuration is valid. The DBA typically then has to enable, tune, and optimize the data repository. Further, there is no easy way for a customer to dynamically and/or automatically adjust the parameters for a database instance or manage other such aspects of a data repository.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing aspects of data storage in an electronic environment. In particular, various embodiments provide a separate control environment, or control plane, that can be used to enable a user to manage and/or alter various aspects of a data environment, or data plane. This "self-service" functionality can be provided via a set of Web services, enabling the user and control plane to act together as a virtual database administrator (DBA). A user or customer can submit a request to the control plane through one of a plurality of externally-visible application programming interfaces (APIs), for example. Various APIs can be used to perform specific functions with respect to a data repository, such as a relational database, in the data environment. A request received to one of the APIs can be analyzed to determine the desired action(s) to be performed in the data plane, such as actions that adjust operational or configuration parameters of a data store or data storage instance. A component such as a workflow component can determine the appropriate tasks for the action, and cause the tasks to be executed in an appropriate order. At least one of these tasks typically will be performed in the data environment, such as to adjust an aspect of a relational database.

Figure 1:
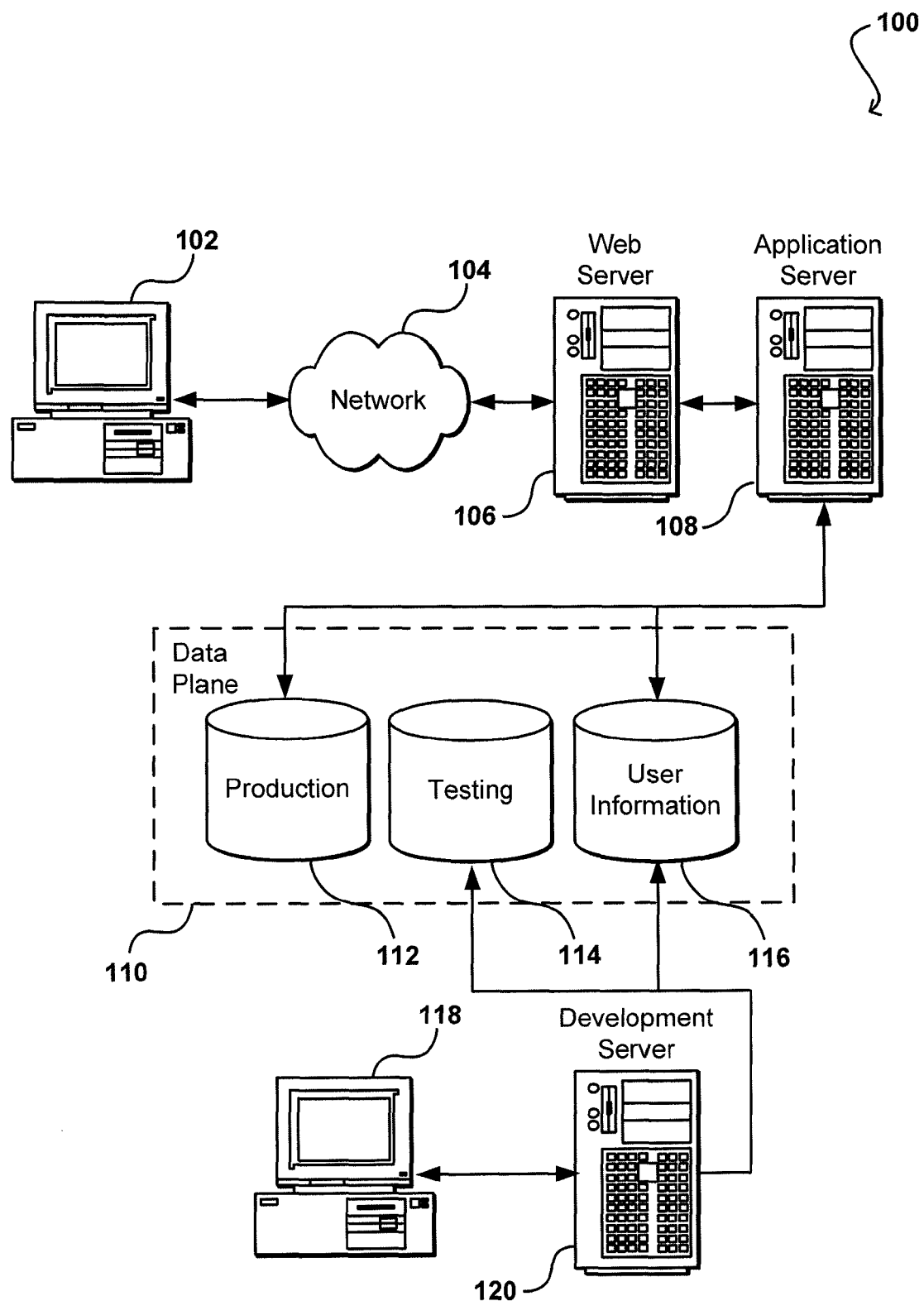
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system.

The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a provider such as an electronic marketplace, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2, discussed in detail below.

Systems and methods in accordance with one embodiment provide a relational database service ("RDS") that enables developers, customers, or other authorized users to easily and cost-effectively obtain and configure relational databases and other such data sources so that users can perform tasks such as storing, processing, and querying relational data sets in a cloud. While this example is discussed with respect to the Internet, Web services, and Internet-based technology, it should be understood that aspects of the various embodiments can be used with any appropriate services available or offered over a network in an electronic environment. Further, while the service is referred to herein as a "relational database service," it should be understood that such a service can be used with any appropriate type of data repository or data storage in an electronic environment. An RDS in this example includes at least one Web service that enables users or customers to easily manage relational data sets without worrying about the administrative complexities of deployment, upgrades, patch management, backups, replication, failover, capacity management, scaling, and other such aspects of data management. Developers are thus freed to develop sophisticated cloud applications without worrying about the complexities of managing the database infrastructure.

An RDS in one embodiment provides a separate "control plane" that includes components (e.g., hardware and software) useful for managing aspects of the data storage. In one embodiment, a set of data management application programming interfaces (APIs) or other such interfaces are provided that allow a user or customer to make calls into the RDS to perform certain tasks relating to the data storage. The user still can use the direct interfaces or APIs to communicate with the data repositories, however, and can use the RDS-specific APIs of the control plane only when necessary to manage the data storage or perform a similar task.

Figure 2:
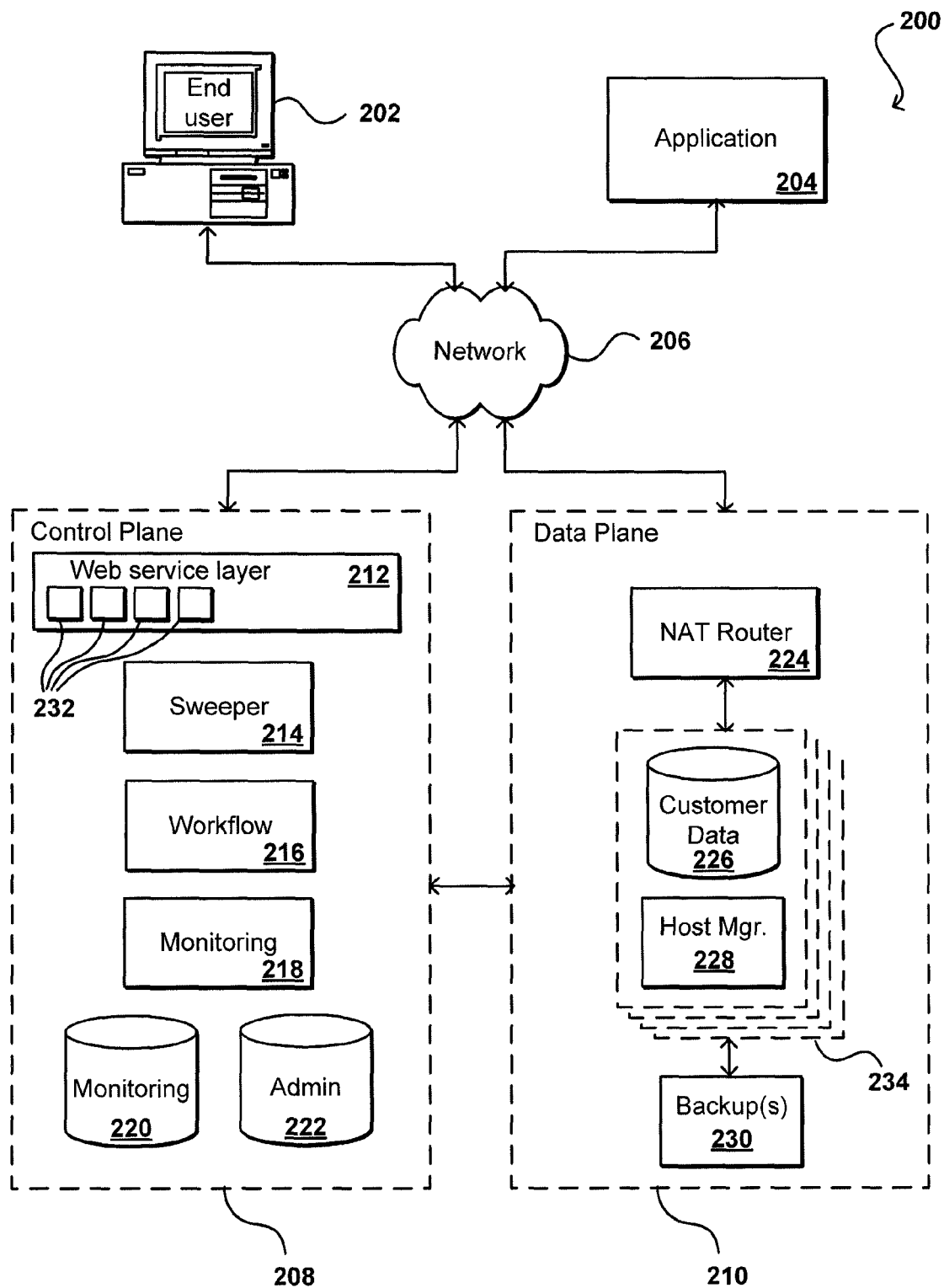
FIG. 2 illustrates an example separation of a control plane and a data plane that can be used in accordance with various embodiments.

FIG. 2 illustrates an example of an RDS implementation 200 that can be used in accordance with one embodiment. In this example, a computing device 202 for an end user is shown to be able to make calls through a network 206 into a control plane 208 to perform a task such as to provision a data repository of the data plane 210. The user or an application 204 can access the provisioned repository directly through an interface of a data plane 210. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation of at least some resources (e.g., hardware and/or software) used to provide the respective functionality.

The control plane 208 in this example is essentially a virtual layer of hardware and software components that handles control and management actions, such as provisioning, scaling, replication, etc. The control plane in this embodiment includes a Web services layer 212, or tier, which can include at least one Web server, for example, along with computer-executable software, application servers, or other such components. The Web services layer also can include a set of APIs 232 (or other such interfaces) for receiving Web services calls or requests from across the network 206. Each API can be provided to receive requests for at least one specific action to be performed with respect to the data environment, such as to provision, scale, clone, or hibernate an instance of a relational database. Upon receiving a request to one of the APIs, the Web services layer can parse or otherwise analyze the request to determine the steps or actions needed to act on or process the call. For example, a Web service call might be received that includes a request to create a data repository. In this example, the Web services layer can parse the request to determine the type of data repository to be created, the storage volume requested, the type of hardware requested (if any), or other such aspects. Information for the request can be written to an administration ("Admin") data store 222, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

The control plane in this embodiment includes what is referred to herein as a "sweeper" component 214. A sweeper component can be any appropriate component operable to poll various components of the control plane or otherwise determine any tasks to be executed in response to an outstanding request. In this example, the Web services layer might place instructions or information for the "create database" request in the admin data store 222, or a similar job queue, and the sweeper can periodically check the admin data store for outstanding jobs. Various other approaches can be used as would be apparent to one of ordinary skill in the art, such as the Web services layer sending a notification to a sweeper that a job exists. The sweeper component can pick up the "create database" request, and using information for the request can send a request, call, or other such command to a workflow component 216 operable to instantiate at least one workflow for the request. The workflow in one embodiment is generated and maintained using a workflow service as is discussed elsewhere herein. A workflow in general is a sequence of tasks that should be executed to perform a specific job. The workflow is not the actual work, but an abstraction of the work that controls the flow of information and execution of the work. A workflow also can be thought of as a state machine, which can manage and return the state of a process at any time during execution. A workflow component (or system of components) in one embodiment is operable to manage and/or perform the hosting and executing of workflows for tasks such as: repository creation, modification, and deletion; recovery and backup; security group creation, deletion, and modification; user credentials management; and key rotation and credential management. Such workflows can be implemented on top of a workflow service, as discussed elsewhere herein. The workflow component also can manage differences between workflow steps used for different database engines, such as MySQL, as the underlying workflow service does not necessarily change.

In this example, a workflow can be instantiated using a workflow template for creating a database and applying information extracted from the original request. For example, if the request is for a MySQL® Relational Database Management System (RDBMS) instance, as opposed to an Oracle® RDBMS or other such instance, then a specific task will be added to the workflow that is directed toward MySQL instances. The workflow component also can select specific tasks related to the amount of storage requested, any specific hardware requirements, or other such tasks. These tasks can be added to the workflow in an order of execution useful for the overall job. While some tasks can be performed in parallel, other tasks rely on previous tasks to be completed first. The workflow component or service can include this information in the workflow, and the tasks can be executed and information passed as needed.

An example "create database" workflow for a customer might includes tasks such as provisioning a data store instance, allocating a volume of off-instance persistent storage, attaching the persistent storage volume to the data store instance, then allocating and attaching a DNS address or other address, port, interface, or identifier which the customer can use to access or otherwise connect to the data instance. In this example, a user is provided with the DNS address and a port address to be used to access the instance. The workflow also can include tasks to download and install any binaries or other information used for the specific data storage technology (e.g., MySQL). The workflow component can manage the execution of these and any related tasks, or any other appropriate combination of such tasks, and can generate a response to the request indicating the creation of a "database" in response to the "create database" request, which actually corresponds to a data store instance in the data plane 210, and provide the DNS address to be used to access the instance. A user then can access the data store instance directly using the DNS address and port, without having to access or go through the control plane 208. Various other workflow templates can be used to perform similar jobs, such as deleting, creating, or modifying one of more data store instances, such as to increase storage. In some embodiments, the workflow information is written to storage, and at least one separate execution component (not shown) pulls or otherwise accesses or receives tasks to be executed based upon the workflow information. For example, there might be a dedicated provisioning component that executes provisioning tasks, and this component might not be called by the workflow component, but can monitor a task queue or can receive information for a provisioning task in any of a number of related ways as should be apparent.

As mentioned, various embodiments can take advantage of a workflow service that can receive requests or calls for a current state of a process or task, such as the provisioning of a repository, and can return the current state of the process. The workflow component and/or workflow service do not make the actual calls or requests to perform each task, but instead manage the state and configuration information for the workflow that enables the components of the control plane to determine the next task to be performed, and any information needed for that task, then generate the appropriate call(s) into the data plane including that state information, whereby a component of the data plane can make the call to perform the task. Workflows and tasks can be scheduled in parallel in order to increase throughput and maximize processing resources. As discussed, the actual performing of the tasks will occur in the data plane, but the tasks will originate from the control plane. For example, the workflow component can communicate with a host manager, which can make calls into the data store. Thus, for a given task a call could be made to the workflow service passing certain parameters, whereby the workflow service generates the sequence of tasks for the workflow and provides the current state, such that a task for the present state can be performed. After the task is performed (or otherwise resolved or concluded), a component such as the host manager can reply to the service, which can then provide information about the next state in the workflow, such that the next task can be performed. Each time one of the tasks for the workflow is performed, the service can provide a new task to be performed until the workflow is completed. Further, multiple threads can be running in parallel for different workflows to accelerate the processing of the workflow.

The control plane 208 in this embodiment also includes at least one monitoring component 218. When a data instance is created in the data plane, information for the instance can be written to a data store in the control plane, such as a monitoring data store 220. It should be understood that the monitoring data store can be a separate data store, or can be a portion of another data store such as a distinct set of tables in an Admin data store 222, or other appropriate repository. A monitoring component can access the information in the monitoring data store to determine active instances 234 in the data plane 210. A monitoring component also can perform other tasks, such as collecting log and/or event information from multiple components of the control plane and/or data plane, such as the Web service layer, workflow component, sweeper component, and various host managers. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each instance 234 in the data plane can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager also perform and/or mange the installation of software patches and upgrades for the data store and/or operating system. A host manger also can collect relevant metrics, such as may relate to CPU, memory, and I/O usage.

The monitoring component can communicate periodically with each host manager 228 for monitored instances 234, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. If a response is not received after a specified number of retries, then the monitoring component can determine that there is a problem and can store information in the Admin data store 222 or another such job queue to perform an action for the instance, such as to verify the problem and re-provision the instance if necessary. The sweeper can access this information and kick off a recovery workflow for the instance to attempt to automatically recover from the failure. The host manager 228 can act as a proxy for the monitoring and other components of the control plane, performing tasks for the instances on behalf of the control plane components. Occasionally, a problem will occur with one of the instances, such as the corresponding host, instance, or volume crashing, rebooting, restarting, etc., which cannot be solved automatically. In one embodiment, there is a logging component (not shown) that can log these and other customer visibility events. The logging component can include an API or other such interface such that if an instance is unavailable for a period of time, a customer can call an appropriate "events" or similar API to get the information regarding the event. In some cases, a request may be left pending when an instance fails. Since the control plane in this embodiment is separate from the data plane, the control plane never receives the data request and thus cannot queue the request for subsequent submission (although in some embodiments this information could be forwarded to the control plane). Thus, the control plane in this embodiment provides information to the user regarding the failure so the user can handle the request as necessary.

As discussed, once an instance is provisioned and a user is provided with a DNS address or other address or location, the user can send requests "directly" to the data plane 210 through the network using a Java Database Connectivity (JDBC) or other such client to directly interact with that instance 234. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 202 or application 204, for example, can be directed to a network address translation (NAT) router 224, or other appropriate component, which can direct the request to the actual instance 234 or host corresponding to the DNS of the request. As discussed, such an approach allows for instances to be dynamically moved, updated, replicated, etc., without requiring the user or application to change the DNS or other address used to access the instance. As discussed, each instance 234 can include a host manager 228 and a data store 226, and can have at least one backup instance or copy in persistent storage 230. Using such an approach, once the instance has been configured through the control plane, a user, application, service, or component can interact with the instance directly through requests to the data plane, without having to access the control plane 232. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 208 can be offered as at least one service by a provider that may or may not be related to a provider of the data plane 210, but may simply be a third-party service that can be used to provision and manage data instances in the data plane, and can also monitor and ensure availability of those instances in a separate data plane 210.

As discussed, one advantage to providing the functionality of a control plane as a Web service or other such service is that the control plane functions as a virtual database administrator (DBA) and avoids the need for a human DBA to perform tasks such as provisioning data. Provisioning data is presently a tedious manual procedure, requiring a DBA to receive the necessary configuration information, determine whether the configuration is valid, optimize and tune the instance, and perform other such tasks, which take a significant amount of time and effort. Further, such an approach provides many opportunities for error, which might not be discovered until after data is lost. Using a control plane or service as described herein, a user or customer can instead submit a call including information such as a type of hardware and a version of a database product. The control plane or service can then perform the necessary tasks to create, delete, modify, expand, or otherwise modify a data store or data storage instance. The control plane also can support several different database engines in a consistent fashion, without requiring a DBA to be an expert in each of the engines. Once provisioned, the user has native access to the data instance(s), and can simply point existing applications (such as MySQL applications) to the DNS address or other location information for the particular instance. There is no restriction or modification of query models or other such functionality, as a user can continue to use applications built on MySQL, Oracle, or other database technology.

When provisioning data stores, data storage instances, or other data resources for a customer, the control plane components in at least some embodiments provides an initial set of configuration parameters for use in setting up the data instance. The parameters of such a default parameter group can include, for example, the buffer cache allocation setting, query timeout setting, connection timeout setting, and/or other such operational or configuration parameters. In some embodiments, an administrative component of a control plane will select or otherwise determine an optimal, or at least default, set of parameter values to use to set up the database. The parameters selected can depend upon any of a number of factors, such as the user, type of database, type of application used or access needed, etc.

In cloud computing or similar scalable resource environments, it can be particularly important to provide a default or initial set of configuration parameters in various embodiments, as customers can have the ability to operate databases on demand, including starting up data instances, scaling storage and/or processing resources, etc. A customer can, for example, create one or more data instances within a specified instance class storage space, and can delete those instances when the instances are no longer needed. In such an embodiment, the system might generate a default set of configuration parameters for the instance class, whereby any instance generated within that class will have the default parameter group applied thereto.

In many cases, the default parameters that are generated are optimized, or at least appropriate or acceptable, for various instances. There might be particular use cases, however, where a customer might want to adjust one or more of the parameters to improve or otherwise adjust performance, availability, or other such aspects. For example, certain applications might be very cache-intensive, such that a customer might want to increase the cache allocations for one or more databases. The customer might want to adjust the parameter before an instance is created, or while an existing instance is running. In some cases, parameters can only be changed when the data instance restarts or reboots, as discussed in detail elsewhere herein.

Systems and methods in accordance with various embodiments address at least some of these and other such issues by providing one or more customer-exposed interfaces enabling customers to make calls into the control plane to adjust, update, or otherwise customize parameters for data instances, data stores, etc. In one embodiment where MySQL is used as a database engine, for example, users can have the ability to adjust the MySQL configuration parameters by submitting an updated or modified parameter group containing the adjusted parameter(s). In embodiments where multiple database engines are utilized, users can provide engine-specific calls and/or updates, or can provide general updates or calls that can be converted or otherwise processed by the control plane for a specific engine corresponding to an instance. Using such an approach, users can customize or tune the parameters of a data instance, or group of data instances, according to the customer workload, type of application, etc. In cases where a default parameter group is applied to a group or class of instances, for example, a user can submit an updated parameter group that can be automatically applied to each of the corresponding instances. During a period of peak load, for example, a customer might want to adjust a buffer cache setting, query timeout setting, or connection timeout setting. In various embodiments, the customer can specify just the new parameter value(s), a full set of values including the new value(s), etc. Various other parameters can be customized as well, and the customized values can be updated over time as needed.

Various embodiments provide one or more such interfaces, such as a set of application programming interfaces (APIs), which enable users to configure the database parameters of various RDS databases. In one embodiment, one or more configuration APIs are provided that are "engine agnostic," or can be used for any supported database engine, utilizing a proper set of abstractions. For example, a customer can use the same API to adjust a connection timeout setting for a MySQL database and an Oracle database. In various embodiments, a user can send a Web service call to one of the APIs, and the information in the call will be processed using an approach similar to that discussed above for processing Web service calls to the control plane Web interface layer, for example.

As discussed, a workflow in the control plane can be instantiated in response to a request to create a dataset, wherein an instance storage space is established in the data plane and the appropriate package manager (e.g., RPM) or host manager is applied. During creation, the workflow can perform a task to pull and/or generate default configuration settings using information from a configuration file, administrative data store, or other appropriate storage location in, or accessible to, the control plane, and can use those settings to generate a default parameter group that can be applied to each respective instance in the data environment. In some embodiments the parameters are generated or determined dynamically, using information from the Web service call, information stored for the user, information for the type of instance being generated, etc. In other embodiments, one or more sets of highly tuned database settings can be stored to an appropriate location in the control plane, and the workflow can direct the selection of an appropriate set to be applied for the current task. In some embodiments, a configuration file is stored in the data plane that is used by the database engine to startup the database. As mentioned, the configuration file might include parameters such as the amount of cache to be allocated for query results, the amount of buffer cache to be allocated, the connection timeout value to be used, etc. As discussed, however, these parameters might not be optimal, or at least preferred, by a customer at any given time. In a cloud computing or conventional RDS system, the ability to edit the configuration file and restart the database is generally not accessible to a user. A user cannot simply utilize an interface of the control plane to log on to, and modify aspects of, a data instance in the data plane.

Systems and methods in accordance with various embodiments provide an internal API-based framework (or other interface framework) that enables user to make any of a number of calls into the control plane to modify any appropriate data parameter(s) via a Web service API or other such interface. For example, a user can make a Web services call such as "ModifyMyDBParams" to the appropriate API to modify any of the modifiable configuration parameters for the respective instance(s). In one embodiment, a customer can create a container, referred to herein as a "DB Parameter Group," to store specific parameter values, or a parameter group, to be used when generating data instances for a particular customer, group, class, application, etc. The customer can select or specify one or more of these parameter groups to be used when creating a database instance, such as may include values for some or all parameters to be used for a database engine, or at least those parameters where the specified values are to be used in place of the default values assigned by RDS (e.g., default.mysql). As discussed, the default values provided by RDS can be determined by the RDS system, or an authorized user thereof, to be optimal and/or appropriate default settings for the customer, application, engine, etc. If a configuration file or bucket exists for a customer, however, the RDS can be configured to instead (or in addition) utilize values from the configuration file when creating instances for that customer.

In addition to being able to specify configuration parameters to be used in generating database instances, a customer might also want the ability to adjust parameters for existing instances. For example, a customer might decide that, based on factors such as workload or performance, an application might be highly cacheable such that it can be advantageous to allocate a larger mount of memory for the respective query cache. In order to increase the query cache size, the user can make a call such as "ModifyDBParameterGroup" that can be received to the appropriate API of the Web services layer of the control plane, and the Web services layer can process the call to place appropriate task information into the Admin data store or another appropriate job queue. The sweeper component, when locating the task in the job queue, can determine the appropriate tasks to be executed, such as to send a request, call, or other such command to a workflow component operable to instantiate at least one workflow for the request. The workflow manager can then work with appropriate components, such as a host manager of a data instance in the data plane, to update the values in the parameter group(s) and apply the updated or modified parameter group(s) to the corresponding instance(s). In some embodiments a customer can specify multiple parameter groups, such as may include 'peak' and 'off-peak' settings, and the user can change settings by performing a call that causes one of the parameter groups to be applied at a specific time. In other embodiments, a customer might make changes for a specific period of time, but later might want to go back to the original or default settings. Various embodiments provide for a call to an API such as "ResetDBParameterGroup" that can adjust one or more of the parameters associated with a parameter group back to the RDS defaults (or other default values). Such a reset value also can be used when the performance of a database instance is decreasing, for example, and the customer wants to attempt to return the instance to proper performance levels.

When a customer submits a request such as a ModifyMyDBParams or ModifyDBParameterGroup call to an appropriate API, the modified parameter group can be assigned a new version number in the control plane. The workflow can cause this new version to be passed to a host manager of the appropriate instance(s) where the new version is to be applied. When the new version is transmitted to the host manager, for example, the new version number can be stored to the Admin data store along with a state value such as "Updating" or "Not_In_Sync", such that a user querying a state of an instance having the parameter group updated can receive a response that can include information such as the current version number, the new version number being applied, and information indicating that the new version is being applied. When the host manager for an instance successfully applies the new parameter group, the host manager can update the current version information in the data environment. A monitoring component periodically checking the status of the host manager can pick up the new version number, and can update the information stored in the Admin data store to indicate that the new version of the parameter group is now the current version, and can update the state to a state such as "IN_SYNC". A customer querying the status then can determine that the new version has been applied and is active. In some embodiments, a notification can be sent to the customer via the control plane when the new parameter group is successfully applied.

An advantage of customers utilizing parameter groups, buckets, configuration files, or other such elements is that a customer does not have to separately tune each instance. A level of abstractions can be provided such that a customer can simply apply a parameter group or change to an entire fleet, class, etc, and all the appropriate instances can receive the updated parameter values automatically. Such a process can be advantageous where multiple databases are used to run an application, for example, and it is desirable to tune all those databases at the same time in the same way for that application. In some cases different types of databases can be used for the application, such that the level of abstraction can further be advantageous as the customer does not need to separately tune for each database engine used for the application, as the differences between engines can be handled automatically by the control plane. Further, a single set of tools can be utilized that is engine-independent, as the control plane can handle the engine-dependent translation.

Figure 3:
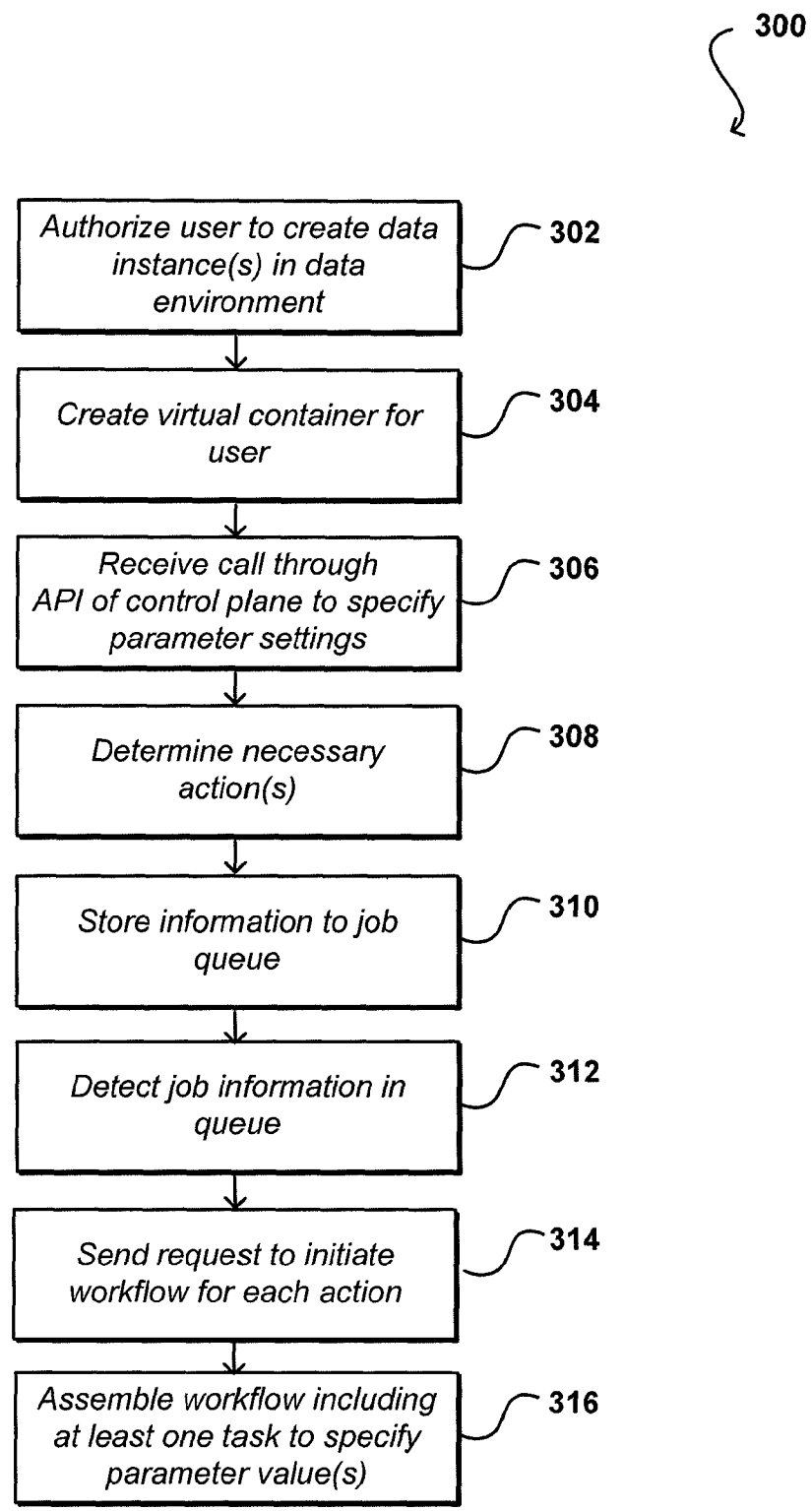
FIG. 3 illustrates an example process for specifying parameter values before the creation of a data instance in the data plane that can be used in accordance with one embodiment.

Using components such as those discussed above, FIG. 3 illustrates an example process 300 in accordance with one embodiment by which a customer can request the specifying and/or modifying of parameter values to be used in creating a database, data instance, data repository, or other such data source in a data environment, here the data plane, using the control plane or a similar data control service. While the term "customer" is used herein to refer to the "owner" of data, or a data store or instance hosted by the RDS system, it should be understood that the term customer is merely an example, and that any appropriate user or developer can be allowed to access the control plane and data plane in the various embodiments. Further, while an embodiment relating to the control of a data environment is described, it should be understood that similar approaches can be used to control and/or manage various other components, devices, applications, services, or other such resources in an environment separate from the control environment.

In the example process, a customer is granted the ability to create data instances in the data plane 302. This can be performed in conjunction with, or independent of, the customer, such as in response to a request from the customer. As part of the initial customer configuration process, a parameter group or 'virtual container' is created for the customer that contains a list of default parameter values 304, and the container is stored in a control plane data store for subsequent access, and tied (such as by a data record or key) to a particular customer, group of customers, customer type, etc. The default values are selected by the RDS components, as are determined to be appropriate for the use type, database engine, application, etc.

A customer can call into the control plane to determine the default parameter value settings. The customer might determine that at least one of the values should be changed for any data instances generated for that customer. Accordingly, a request, such as a Web services call, can be received from the customer through one of a plurality of control plane APIs or other such customer-facing control plane interface components 306. In one embodiment, the customer can call into a "ModifyDBParameterGroup" API to indicate the change in value(s). The request is analyzed to determine any action needed to process the request 308. As discussed, this can take the form of a component of a Web services layer parsing the request to determine the action(s) being requested. In an embodiment where the API receiving the request corresponds to a specific action to be performed, the Web services layer can extract information from the request to be used in determining aspects or parameters of the action to be performed. In one embodiment, the parameter information in the control plane data store can be updated directly, while in other embodiments information to be updated to the control plane data store (or configuration file, for example), is written to a job queue 310, such as may be located in an Admin data store or other such storage location. The job queue can be monitored, such as by a sweeper component, to determine the presence of job information 312 and, when job information is detected, a request can be sent to initiate a workflow for the requested action 314. This can include a request sent by the sweeper component to a workflow component and/or service to instantiate a workflow. In other embodiments, a workflow component might monitor the job queue for jobs, or a component of the Web services layer may send the job information directly to a workflow component. Upon receiving the job information, the information is analyzed to determine and/or assemble an appropriate workflow for the requested action 316. In this example, the workflow might include a single task, such as to update the parameter value information stored for the user in the control plane data store, etc. In other embodiments, the workflow might include additional and/or alternative tasks such as to create a configuration file that will ultimately be installed for a data instance created in the data plane to which the configuration file applies. Various other tasks can be included and executed to perform similar functionality in other embodiments.

Figure 4:
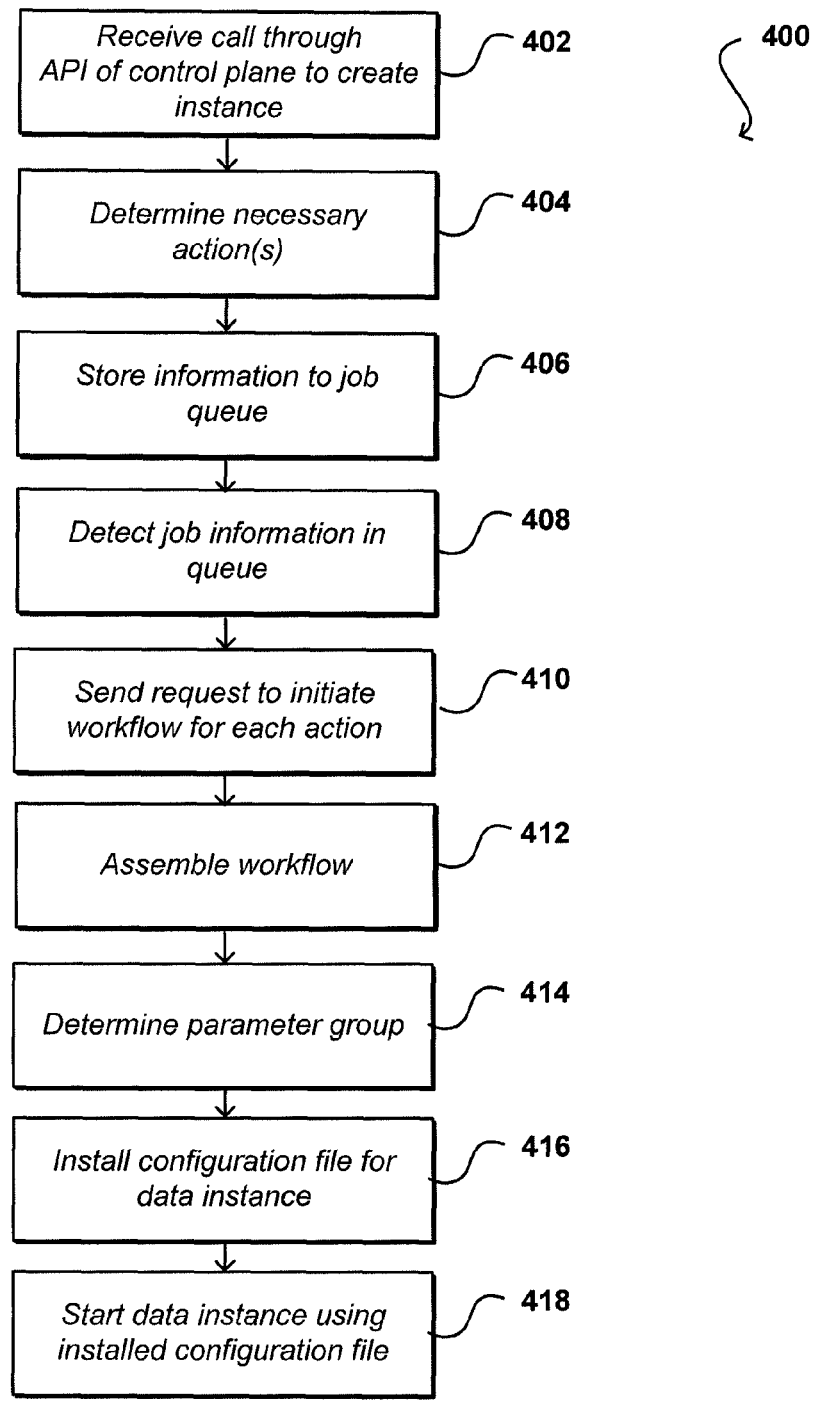
FIG. 4 illustrates an example process for creating a data instance and applying specified parameter values in the data plane that can be used in accordance with one embodiment.

FIG. 4 illustrates steps of an example process 400 for creating a data instance in the data plane using the updated (or other) configuration information in accordance with one embodiment. In this example, a request, such as a Web services call, can be received through one of a plurality of control plane APIs or other such customer-facing control plane interface components 402 to create a data instance. In one embodiment, the customer or an application can call into a "CreateDBInstance" API to indicate the instance(s) to be created. The request is analyzed to determine any action needed to process the request 404, and information for the creation is written to a job queue 406. The sweeper component monitoring the job queue can determine the presence of the job information 408 send a request to initiate a workflow for the requested action(s) 410. The job information is analyzed to determine and/or assemble an appropriate workflow for the requested action 412, which can include tasks such as to provision an RDS database instance, generate any necessary storage volumes, install the database, contact a host manager for the instance to specify a setup parameter group to be used for the instance, persist the configuration information on disc in the data plane, etc. As discussed, different tasks can be selected for the workflow based upon factors such as the type of action requested, the parameters of the request, and the type of database engine being used. The control plane in this example can direct, via the workflow, the list of parameters to be used in generating the configuration file 414, installing the configuration file for the instance in the data plane 416, and starting the database instance using the parameter values from the installed configuration file 418.

As discussed, the tasks can be managed in part, beginning with the first task of the workflow, by sending state information to a host manager in the data environment operable to use the state information to determine a task to be performed, perform the task with respect to a data repository and/or data instance, and return a response upon completion of the task. Upon receiving the response, the workflow component can determine whether there is another task to be performed. If so, state information for the next task is sent to the host manager, and upon completion of that task the host manager sends a response to the workflow component. After the final task has been completed, a message can be sent to the requesting customer (or another appropriate user, application, or location) that the requested action has been completed. After the action has been performed, the customer is able to directly access the data instance upon which the action was performed using a data interface of the data environment, without accessing or passing through the control plane.

Figure 5:
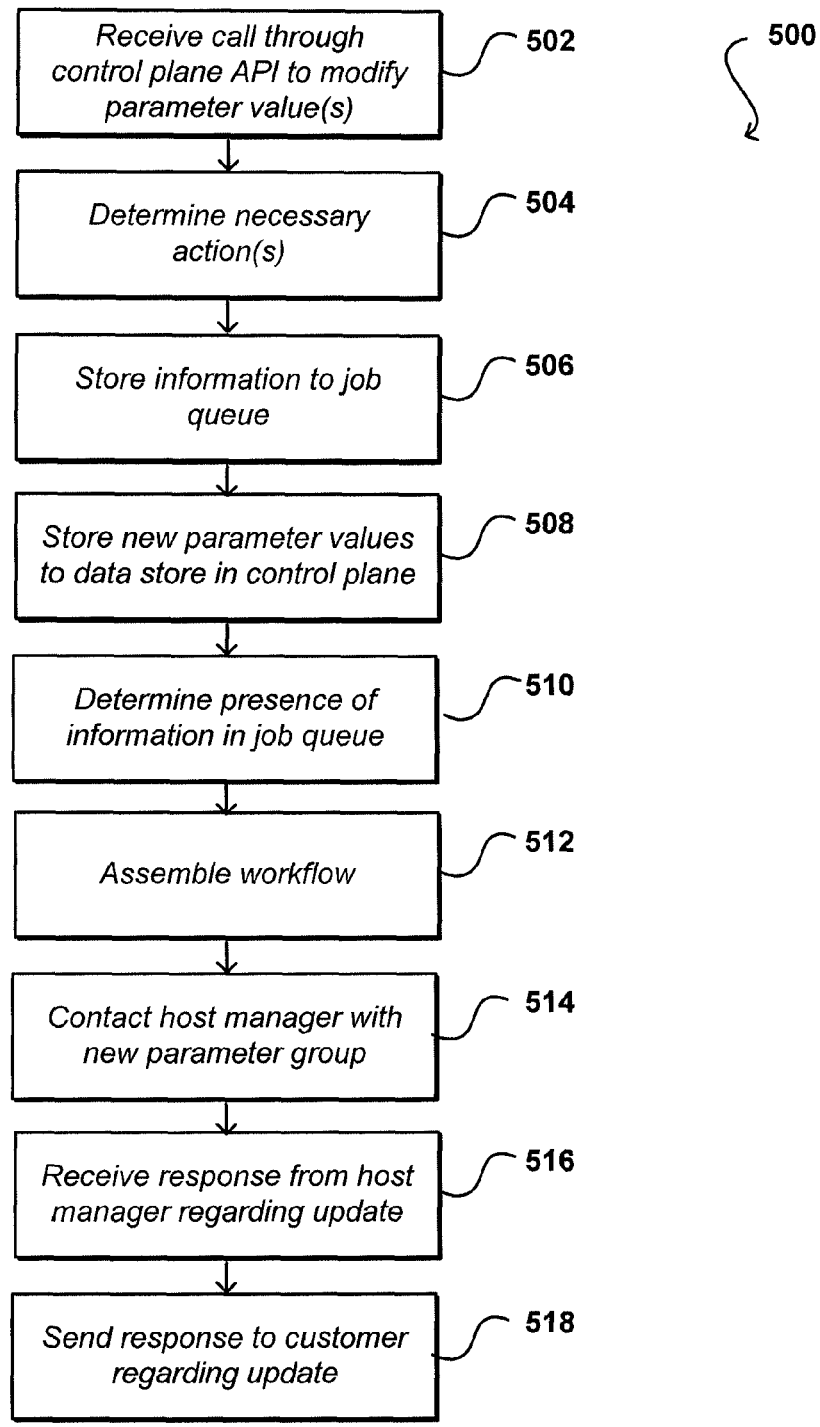
FIG. 5 illustrates an example process for requesting a change in parameter values for at least one data instance in the data plane that can be used in accordance with one embodiment.

Even after one or more instances are up and running, however, a customer might want to adjust one or more of the configuration parameters. For example, the customer might want to adjust the query timeout setting based on current workload levels. FIG. 5 illustrates an example of a process 500 for updating parameters for a running instance that can be used in accordance with various embodiments. In this example, a request can be received through a control plane APIs, such as a "ModifyDBParameterGroup"API, to indicate a change in value of a database parameter 502, such as a change in query timeout from ten to fifteen seconds. The request is analyzed to determine any action needed to process the request 504, and information for the creation is written to a job queue 506. The updated parameter value information can be stored to the data store in the control plane 508, either directly or as a task in the job queue or resulting workflow. The sweeper component monitoring the job queue can determine the presence of the job information 510, and in at least some embodiments can send a request to initiate a workflow for the requested action(s). The job information is analyzed to determine and/or assemble an appropriate workflow for the requested action 512. As tasks of the workflow, the control plane can call into a host manager for each data instance associated with one or more specified parameter groups to install the updated configuration file 514. A response can be received back from each host manager regarding the update 516, and a response can be sent to the customer indicating whether all instances were able to accept the requested change successfully 518.

In some cases, however, the tasks of the workflow can depend, at least in part, upon the type(s) of parameter(s) being updated. For example, many databases have at least two types of parameter, including parameters that are "static" and parameters that are "dynamic." Dynamic parameters can be set at runtime, such that the workflow task can cause the host manager to apply the updated dynamic parameter(s) at the substantially time of the request. Static parameters include parameters that can be set only during the startup process for a database (e.g., query timeout), and not while the database is running. If one of the tasks of the workflow causes a new configuration file to be stored in the data plane for an instance, and a change to a static parameter is included, the database will not pick up and/or the change until the database is rebooted. In some embodiments and/or instances, the workflow can issue an explicit reboot task to cause the database to be rebooted in the data plane. This can involve the workflow contacting the customer for approval, or otherwise obtaining authorization (such as part of the received request) to reboot the database. In other embodiments and/or situations, the configuration file can be stored in the data plane, and any updated static parameter value will be applied upon a subsequent reboot. In some embodiments, a user can make an explicit web services call to an appropriate API to force or request a reboot in the data plane. In other cases, the change will take effect when the reboot occurs as a result of a crash, scheduled reboot, etc.

In some embodiments, the type of parameter will be indicated by a field, flag, or other such approach, while in other embodiments a global list will indicate which parameters are static and which are dynamic. The type of parameter can be determined by the database engine, and at least some of the static parameters can be defined by the control plane. In some embodiments, instead of a 'type' the control plane can utilize an 'apply method' or similar parameter that indicates whether the parameter value should be applied immediately or whether the system should wait for a reboot. When the apply method specifies a reboot, the user can be informed such that user has the option of requesting an explicit reboot. In some cases the reboot can be specified as part of the initial update parameter call, or an agreement can specify that any time a static parameter is indicated to be changed, the system as part of the workflow should reboot the system.

In some embodiments, the monitoring component of the control plane can communicate periodically with the host manager for a data instance, as discussed above. Using such periodic communications, the monitoring component can determine when the database has rebooted based upon an event or communication received from one or more of the respective host managers. The monitoring component can extract information about the reboot, such as the current version number of the new configuration file that has been applied, and can update the information in the appropriate control plane data store. For example, if an update was to be made to a static parameter upon reboot, the parameter in the control plane data store could have had a "pending" or similar value associated therewith. Once the database has been rebooted and the new parameter value applied, the value for the parameter can be updated to "current" or "applied," for example. In other cases, each parameter value can be associated with a version number, and the current version number for the configuration file can be updated when a reboot is detected. A customer can have the ability to request the current parameter values by sending a Web service call to the appropriate API, etc.

While customers can desire the ability to make changes to various operating or configuration parameters of various data instances, the provider typically will have certain guarantees that have to be met regarding availability and performance. Accordingly, it can be desirable in at least some embodiments to prevent customers from making changes that can significantly negatively impact the availability and/or performance of the data instances. In some embodiments, parameters that can affect availability might be restricted from being changed by a customer. In other embodiments, various such parameters can be changed by a customer, but the provider can define a range or set of values to which the customer must adhere. The range of values can be the same for all customers and applications, or can vary between use cases, such as where certain customers are "preferred customers" or where those customers agree to certain possible results if those customers change various parameters. In some embodiments a customer can call an API such as a "DecribeEngineDefaultParameters" whereby the customer can obtain information such as a list of parameters supported by the RDS system; the parameters for the particular engine (e.g., MySQL); current, default, and/or pending values for each parameter; the type of each parameter (e.g., static or dynamic); whether each parameter is modifiable; and allowable ranges or values for at least some of the modifiable parameters; as well as other such information. as well as which parameters are modifiable. In some embodiments, at least some of the parameter values requested to be changed are explicitly validated before being applied, in order to ensure that the values fall within an acceptable range.

In some embodiments, a customer and/or the provider can specify a schedule of parameter values to be used for a data instance, instance class, etc. For example, a customer might have a significant amount of user traffic during the day, but very little traffic at night, such that the customer chooses to run large and/or cache-intensive operations at night. In such an example, the customer might want to have different connection timeout values during the daytime, and might want to have different cache allocations during those hours of the night when specific applications are scheduled to run. In other cases, traffic or workload might vary for any of a number of reasons, such as weekday versus weekend, holiday or seasonal variations, etc. Accordingly, a schedule might be stored in the control plane that can cause a workflow component to communicate a change in the current configuration file to the appropriate host manager(s) at the appropriate times. In some cases where the parameters change often (e.g., daily) between set values, there might be multiple versions of the configuration file stored in the data plane, such that the workflow component only need communicate the change in version number to the host manager. Such an approach can prevent the need to send parameter value information each time a change is to be made.

In some embodiments, a customer can be allowed to select fractions, percentages, or other relative values instead of fixed values for one or more parameters. For example, a customer might want the allocated buffer cache to be proportional to the current workload or allocation. In such an example, the customer can be allowed to specify that the buffer cache should be 25% of the allocated storage, 25% of the instance of the memory being executed, etc. A component of the control plane can determine the proper value based on the current allocation, etc., and make adjustments as necessary. In some cases the values can be changed at specific times or intervals, while in some embodiments the values can be monitored and updated continually. In order to prevent excessive changes and/or changes due to temporary spikes or glitches, the changes can be made after the allocation changes by a certain amount over a certain period of time, by averaging the values over a number of previous intervals, etc. Specifying ranges or percentages instead of fixed values can be advantageous since RDS allows customers to perform actions such as to scale various instances or add more storage space on the fly. Thus, when the customer changes a compute node from a small node to a large node, for example, the customer does not have to go in and adjust the various parameters since RDS can determine the appropriate values based on the user input and automatically change or "auto-scale" the parameter values as needed.

As discussed, a customer in some embodiments can have the ability to specify multiple parameter groups, such as groups to use at different times, for different applications, for different instance classes, etc. Accordingly, there is a risk that at least some of the parameters will have different values specified in different groups that can potentially cause conflicts that need to be resolved. For example, if an application is being run at a certain time of day, there might be a parameter group for the application and a parameter group for the time, and the system can take the union of these parameter group to apply at the current time. In one embodiment, any parameter value that was explicitly set by a customer will take precedence over a default value for that parameter. In other cases, the more recently specified value can take precedence. In some cases, the more conservative of the two values can be selected, in order to minimize a potential negative impact availability, etc. In some cases, the performance can be monitored for a period of time and, if the system is performing adequately, the less conservative value can be applied for a period of time, an intermediate value can be applied, etc. Various other conflict resolution approaches can be used as known in the art or subsequently developed for such purposes.

In some embodiments, the monitoring component of the control plane can function as part of a feedback loop, as the monitoring component (or a similar component of the control plane) can periodically receive performance information from the host manger(s), whereby the control plane can analyze the performance information and determine any adjustments to be made to the various parameters. The adjustments can be according to a schedule or specified percentage or range, for example, or can instead be made according to one or more algorithms selected by the provider to optimize performance or availability, for example. During period of heavy workload, for example, it might be desirable to increase the connection timeout, and when the available cache is running low, it might be necessary to adjust the amount of cache, etc. Adjustments also can be made according to various rules or policies applied for specific customers, applications, etc. In some embodiments a dynamic parameter can be adjusted automatically, while changes for static parameters might be suggested to a customer, as the change can require a rebooting (and temporary unavailability) of the data instance.

Figure 6:
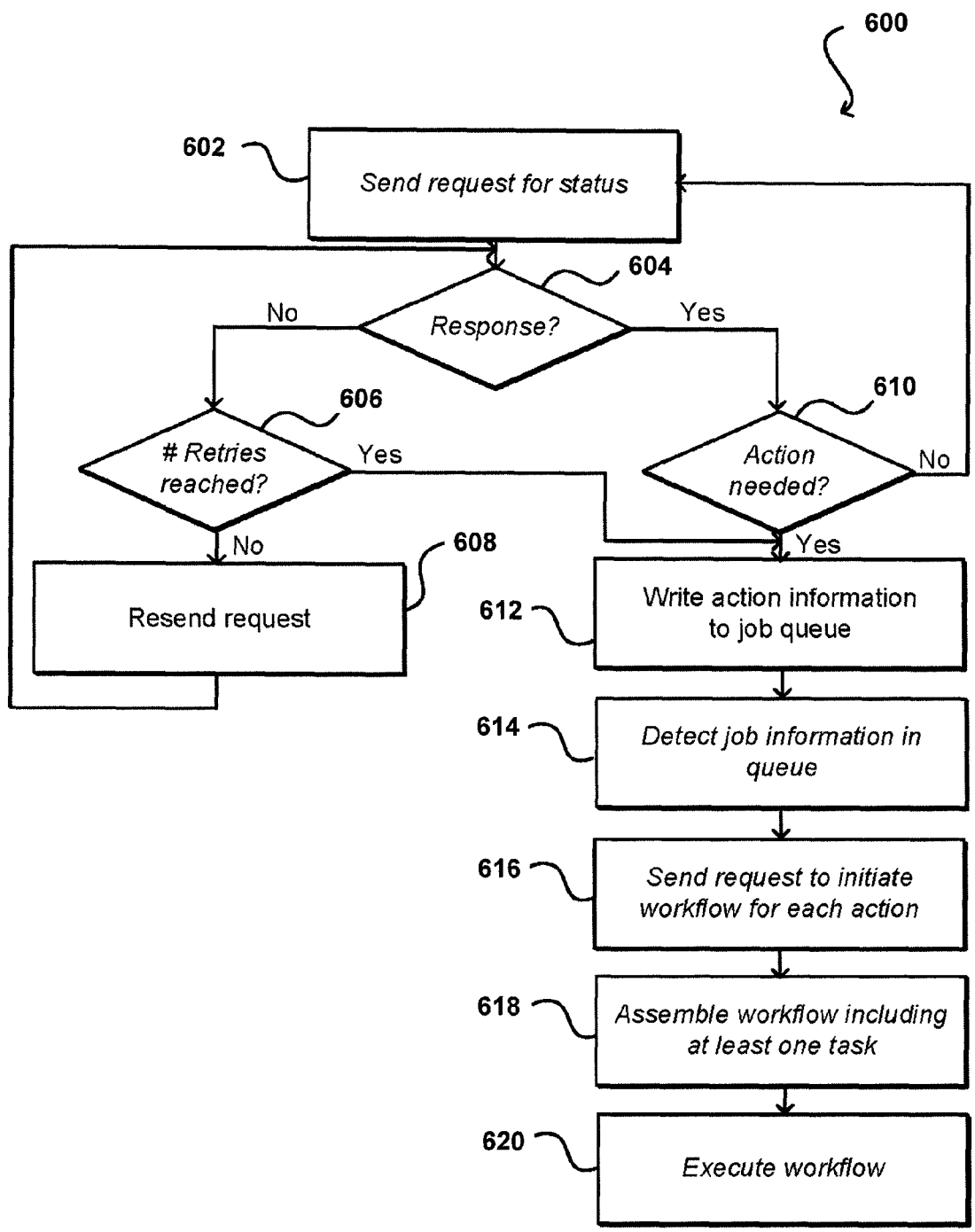
FIG. 6 illustrates an example process for monitoring performance of a data instance that can be used in accordance with one embodiment.

FIG. 6 illustrates an example process 600 by which a control plane or control service can monitor the performance of a data instance (or data store, repository, etc.) in a data environment. A request for status is sent from the control plane to a host manager component for a data instance 602. A determination is made as to whether a response is received within a specified amount of time 604. If no response is received, it is determined whether a threshold number of requests have been sent 606. If a threshold number of requests have not been sent, another request can be sent 608. If a response message is received, the response is analyzed to determine whether any action needs to be taken 610, such as whether there are any errors or tasks to be addressed, whether the performance information indicates that a parameter value adjustment should be made, or whether the version number of the current parameter group has changed. If not, and the instance is determined to be healthy, the process can continue with another request for status being sent at a later time. If the response message indicates that an action should to be performed with respect to the data instance, information for the action, such as the type of action and parameters to be used or adjusted to perform the action, is written to a job queue 612, such as may be located in an Admin data store or other such storage location. The job queue can be monitored to determine the presence of job information 614, such as by a sweeper component, and when job information is detected, a request can be sent to initiate a workflow for the requested action 616. In other embodiments, a workflow component might monitor the job queue for jobs, or a component of the Web services layer may send the job information directly to a workflow component.

Upon receiving the job information, the information is analyzed to determine and/or assemble an appropriate workflow for the requested action 618. The workflow is then executed 620. When the workflow includes tasks to be performed in the data environment, state or other information can be sent to a host manager in the data environment to perform the task and execute the workflow, such as may be accomplished using a process described above. If the final task is completed successfully, the data instance can simply continue to process requests sent from customers or applications via a data plane interface. If the workflow is to perform an action in the control environment, such as to update version and state information in an Admin data store, the workflow can direct the appropriate components of the control environment to execute the various tasks. If any task cannot be completed successfully, or if the task would require an action such as a reboot of a data instance, for example, a message or other notification can be sent to the customer (or another appropriate user, application, or location). Various other notification actions can occur, such as generating an action notification and/or adding information to an error log.

As mentioned, the control plane layer can take advantage, or "sit on top," of various basic software frameworks for performing tasks such as: implementing workflows, establishing secure communication channels between the host managers of the data plane and the components of the control plane, installing software on the instances of the data plane, and performing various database backup and recovery procedures.

For example, a control plane layer can take advantage of a workflow service to manage workflows. As commonly known, a key characteristic of any workflow engine is that the engine enables asynchronous and resumable processing. As discussed above, a workflow can be thought of as a state machine that starts with an initial state and goes through a series of intermediate state transitions by executing different steps of the workflow before reaching the end goal. This end goal can be thought of as the terminal state of a state machine. A workflow service offers the ability to create workflows, and provides hooks to determine the current state of a given workflow and the step(s) to next be executed. The service can store the current state of the state machine, keeping track of the steps which executed successfully and the steps that must be executed to keep the workflow moving. The service does not, in general, actually execute the state transitions for us. The precise tasks of executing the tasks for a workflow will in many embodiments be performed by the "client" components of the workflow. Since a control plane can have multiple workflows running in parallel at any given time, and these workflows can be for performing different tasks, the control plane can take advantage of an architecture that is able to schedule multiple workflows and execute multiple activities in parallel.

Another architecture that can be utilized advantageously relates to providing secure communications to the host managers of the data plane from the components of the host plane. In one embodiment, the workflow and monitoring components of the control plane are constantly communicating with the host managers to perform various tasks (e.g., database maintenance and software installation), as well as to check the status of the various instances and/or repositories. It is important in at least some embodiments that all communications between the control plane and the host managers occur over a secure network that prevents anyone from eavesdropping or issuing unauthorized commands to the host managers.

In one embodiment, all communication channels to the host managers are secured using a hypertext transfer protocol over a secure socket layer (SSL). Each application server hosting a host manager application can be started using scripts at boot-up of an instance. Before starting the application server engine, a script can be executed that generates a self-signed certificate and installs the certificate to enable the SSL communication channel(s). SSL communication is used in one embodiment for encrypting the communication channel and not for client authentication. Client authentication is instead achieved with a public/private key signature embedded in each request, such that in one embodiment all clients sign query string parameters using a private key. This signature can be validated by a custom interceptor, which can be deployed with the application server for the host manager. Further, a security group (i.e., firewall rules) can be established for each monitored instance in the data plane such that only hosts sitting in a given network or secure group can communicate using the host manager port. Secure information and credentials (such as private keys) can be stored in an appropriate keystore, which can provide for functionality such as key management and rotation.

The installation of the host manager application and any updates also can be managed for each instance, in a way that does not require taking down all the other instances. In one embodiment, an instance starts the application server engine at bootup, and the host manager is installed by calling the application server manager framework to deploy the new host application. As with other communications, the communication can be intercepted and the client authenticated before installing software or pushing updates to a host manager, which can be accomplished without affecting the availability of existing repositories.

Another aspect that can rely upon an underlying framework relates to repository and data backup. It can be desirable for the control plane to backup customer repositories and instance for various reasons, such as user-initiated backups (which can be performed during the backup time windows) and system-initiated backups during database restore, etc. A single framework can be implemented to handle both instances. To backup a repository, a framework can handle backing up both the data files and any associated log files. While various steps and processes will be described, it should be understood that various steps and approaches can differ from various database engines, such as MySQL and others.

An approach for backing up data in accordance with one embodiment suspends data operations until shapshots are taken of the appropriate data volumes, and the log files a similarly copied into an appropriate location. For example, an Admin tier can wait for the backup window before initiating a backup procedure. Once inside the backup window, the Admin tier can reate a workflow that will create a workflow instance for repository backups. In one example, the workflow invokes a "supendDatabaseForBackup" or similar API for the host manager. This API can manage tasks to, for example, flush and lock the tables, suspend I/O to the data volume, create and mount an LVM snapshot for the log volume, create a log position file with the last log position, and start a timer to resume the database. This timer can be used to resume the repository in case the Admin tier hangs up while performing a task, such as taking snapshots, preventing the repository from being accidentally suspended for indefinite period of time. The workflow can poll the host manager for completion of these and/or other such tasks. Once the workflow has confirmed that the host manager has suspended the repository, the workflow can will attempt to backup the data volumes using a set of ordered tasks. For example, the workflow can indicate to create snapshots of each data volume, and verify that the snapshots have been successfully created. A row can be inserted for each snapshot volume in a location such as a backup_data_volumes table. Subsequently, the workflow can invoke a host manager's "resumeDatabaseFromBackup" or similar API. This process can copy the repository logs and log position information to an appropriate storage location, can unmount the log snapshot, remove log snapshot log volume, and unlock all tables. The Admin tier then can create a customer event that indicates the backup has been completed and the repository is again available.

As discussed, the log files also can be backed up in a similar fashion. The logs can be used to perform tasks such as replaying various transactions in case the data files have to be restored. The engine logs can be copied to an appropriate storage location, such that previously backed-up log files can be obtained using a simple list command. A host manager will use this result to determine whether there are logs that need to be copied. For example, the host manager can request a bucket list to obtain the list of log files written such that the last sequence can be backed up. If new logs have been created, it can first be determined that the logs are not actively being written to by a database engine, and then the logs can be copied and the copying verified to have been performed successfully.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of managing configuration parameters for a relational database instance using one or more self-service Web services, comprising:

under control of one or more computer systems configured with executable instructions, exposing a plurality of application programming interfaces (APIs), to a user, for receiving a Web service request associated with the user at a control environment, each API corresponding to a desired action to be performed with respect to at least one database instance for the user in a database environment;

providing a default parameter group for at least one database instance to be provisioned in the database environment for the user, the default parameter group including a first version number and at least two database configuration parameters indicating how the at least one database instance is to operate; and receiving, at the control environment, a first Web service request associated with the user to apply a modified parameter group to the at least one database instance;

parsing, at the control environment, the first Web service request to select an API of the plurality of APIs corresponding to a desired action to be performed;
assigning a second version number to the modified parameter group in the control environment;
causing at least one task to be performed to apply the modified parameter group when provisioning the at least one database instance in the database environment, the modified parameter group including the second version number and at least one database configuration parameter different from the database configuration parameters of the default parameter group,
wherein the user is able to specify or modify parameter values of one or more database instances by submitting a single Web service request to the control environment.

2. The computer-implemented method of claim 1, wherein the default parameter group includes at least one parameter value optimized for the at least one database instance to be provisioned in the database environment.

3. The computer-implemented method of claim 1, further comprising:
updating information stored in the control environment for a current parameter group version of the at least one database instance and state information representing any changes being applied to the at least one database instance.

4. The computer-implemented method of claim 1, wherein the database configuration parameters further include at least one of:
a buffer cache allocation setting, a query timeout setting, an amount of cache to be allocated for query results, or a connection timeout setting.

5. A computer-implemented method of enabling a user to manage operational parameters of data instances in a database environment using a separate control environment, comprising:
under control of one or more computer systems configured with executable instructions,
exposing a plurality of application programming interfaces (APIs), to a user, for receiving a Web service request associated with the user at a control environment, each API corresponding to a desired action to be performed with respect to one or more data instances for the user in the database environment;
providing a default parameter group for the one or more one data instances to be provisioned in the database environment for the user, the default parameter group including a first version number and at least two database configuration parameters indicating how the one or more data instances are to operate;
receiving, at the control environment, a first Web service request associated with the user to apply a modified parameter group to the at least one database instance;
parsing, at the control environment, the first Web service request to select an API of the plurality of APIs corresponding to a desired action to be performed;
assigning a second version number to the modified parameter group in the control environment;
causing the modified parameter group to be applied for the one or more data instances, the modified parameter group including a second version number and at least one database configuration parameter different from the database configuration parameters of the default parameter group,
wherein the user is able to modify parameter values for any of the one or more data instances before creation of the one or more data instances or while any of the one or more data instances is running in the database environment.

6. The computer-implemented method of claim 5, wherein updated parameter values of the modified parameter group are applied to the one or more data instances at substantially the time of the Web service request when the updated parameter values are dynamic values, and
wherein the updated parameter values are applied to the one or more data instances upon a reboot of the one or more data instances when the updated parameter values are static values.

7. The computer-implemented method of claim 6, further comprising:
in response to receiving a Web service request to the control environment through one of the plurality of APIs, causing the one or more data instances to reboot, whereby the static values are applied.

8. The computer-implemented method of claim 5, wherein causing the modified parameter group to be applied for the one or more data instances further comprises installing a configuration file including at least one parameter value for each data instance to which the modified parameter group is to be applied.

9. The computer-implemented method of claim 5, wherein the database environment is operable to provide a plurality of data instances in a data instance class, and wherein the user is further able to specify the modified parameter group for all of the plurality of data instances in the data instance class using a single Web service call.

10. The computer-implemented method of claim 5, further comprising:
in response to the Web service request, executing a workflow in the control environment including at least one task to cause the modified parameter group to be applied for the one or more data instances, the workflow further including at least one task to update information for a current parameter group version of the one or more data instances and state information representing any changes being applied to the one or more data instances.

11. The computer-implemented method of claim 10, wherein a monitoring component of the control environment periodically communicates with a host manager for each of the one or more data instances and, in response to the host manager updating a version of a parameter group for the one or more data instances, the monitoring component updates the information for the current parameter group version and the state information.

12. The computer-implemented method of claim 5, wherein the user is able to specify a relationship between a parameter value and an aspect of the database environment, and
wherein the parameter value is capable of being automatically updated using the relationship and changes in the aspect of the database environment.

13. The computer-implemented method of claim 5, wherein the Web service request is database engine independent.

14. The computer-implemented method of claim 5, wherein the database configuration parameters further include at least one of:
a buffer cache allocation setting, a query timeout setting, an amount of cache to be allocated for query results, or a connection timeout setting.

15. A system for enabling a user to manage operational parameters of data instances in a database environment using a separate control environment, comprising:

a processor; and a memory device including instructions that, when executed by the processor, cause the processor to:

expose a plurality of application programming interfaces (APIs), to a user, for receiving a Web service request associated with the user at a control environment, each API corresponding to a desired action to be performed with respect to one or more data instances for the user in the database environment;

provide a default parameter group for the one or more one data instances to be provisioned in the database environment for the user, the default parameter group including a first version number and at least two database configuration parameters indicating how the one or more data instances are to operate;

receive, at the control environment, a first Web service request associated with the user to apply a modified parameter group to the at least one database instance;

parse, at the control environment, the first Web service request to select an API of the plurality of APIs corresponding to a desired action to be performed;

assign a second version number to the modified parameter group in the control environment;

cause the modified parameter group to be applied for the one or more data instances, the modified parameter group including a second version number and at least one database configuration parameter different from the database configuration parameters of the default parameter group, wherein the user is able to modify parameter values for any of the one or more data instances before creation of the one or more data instances or while any of the one or more data instances is running in the database environment.

16. The system of claim 15, wherein updated parameter values of the modified parameter group are applied to the one or more data instances at substantially the time of the Web service request when the updated parameter values are dynamic values, and wherein the updated parameter values are applied to the one or more data instances upon a reboot of the one or more data instances when the updated parameter values are static values.

17. The system of claim 16, wherein the instructions when executed further cause the processor to:

in response to receiving a Web service request to the control environment through one of the plurality of APIs, cause the one or more data instances to reboot, whereby the static values are applied.

18. The system of claim 15, wherein causing the modified parameter group to he applied for the one or more data instances further comprises installing a configuration file including at least one parameter value for each data instance to which the modified parameter group is to be applied.

19. The system of claim 15, wherein the database environment is operable to provide a plurality of data instances in a data instance class, and wherein the user is further able to specify the modified parameter group for all of the plurality of instances in the data instance class using a single Web service call.

20. The system of claim 15, wherein the instructions when executed further cause the processor to:

in response to the Web service request, executing a workflow in the control environment including at least one task to cause the modified parameter group to be applied for the one or more data instances, the workflow further including at least one task to update information for a current parameter group version of the one or more data instances and state information representing any changes being applied to the one or more data instances, wherein a monitoring component of the control environment periodically communicates with a host manager for each of the one or more data instances and, in response to the host manager updating a version of a parameter group for the one or more data instances, the monitoring component updates the information for the current parameter group version and the state information.

21. A non-transitory computer readable storage medium storing instructions for managing operational parameters of data instances in a database environment using a separate control environment, the instructions when executed by a processor causing the processor to:

expose a plurality of application programming interfaces (APIs), to a user, for receiving a Web service request associated with the user at a control environment, each API corresponding to a desired action to be performed with respect to one or more data instances for the user in the database environment;

provide a default parameter group for the one or more one data instances to be provisioned in the database environment for the user, the default parameter group including a first version number and at least two database configuration parameters indicating how the one or more data instances are to operate;

receive, at the control environment, a first Web service request associated with the user to apply a modified parameter group to the at least one database instance;

parse, at the control environment, the first Web service request to select an API of the plurality of APIs corresponding to a desired action to be performed;

assign a second version number to the modified parameter group in the control environment;

cause the modified parameter group to be applied for the one or more data instances, the modified parameter group including a second version number and at least one database configuration parameter different from the database configuration parameters of the default parameter group, wherein the user is able to modify parameter values for any of the one or more data instances before creation of the one or more data instances or while any of the one or more data instances is running in the database environment.

22. The non-transitory computer readable storage medium of claim 21, wherein updated parameter values of the modified parameter group are applied to the one or more data instances at substantially the time of the Web service request when the updated parameter values are dynamic values, and wherein the updated parameter values are applied to the one or more data instances upon a reboot of the one or more data instances when the updated parameter values are static values.

23. The non-transitory computer readable storage medium of claim 22, wherein the instructions when executed further cause the processor to:

in response to receiving a Web service request to the control environment through one of the plurality of APIs, cause the one or more data instances to reboot, whereby the static values are applied.

24. The non-transitory computer readable storage medium of claim 21, wherein applying the modified parameter group for the one or more data instances further comprises installing a configuration file including at least one parameter value for each data instance to which the modified parameter group is to be applied.

25. The non-transitory computer readable storage medium of claim 21, wherein the database environment is operable to provide a plurality of data instances in a data instance class, and wherein the user is further able to specify the modified parameter group for all of the plurality of instances in the data instance class using a single Web service call.

* * * * *